May 1, 1951 M. J. DREW 2,551,318
CHESS INSTRUCTION APPARATUS
Filed June 1, 1945 2 Sheets-Sheet 1

Inventor
Morice James Drew
By
Frank L. Appleman
Attorney

May 1, 1951 M. J. DREW 2,551,318
CHESS INSTRUCTION APPARATUS
Filed June 1, 1945 2 Sheets-Sheet 2
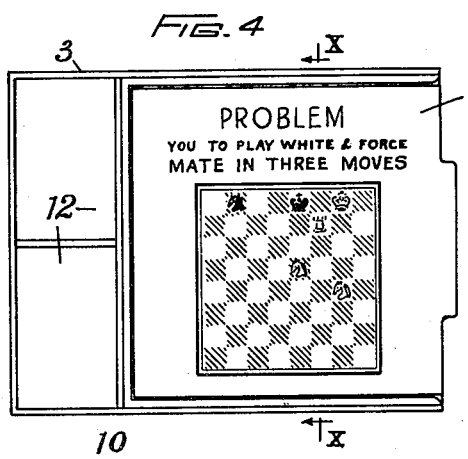
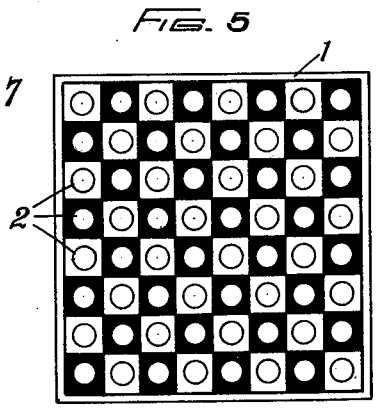
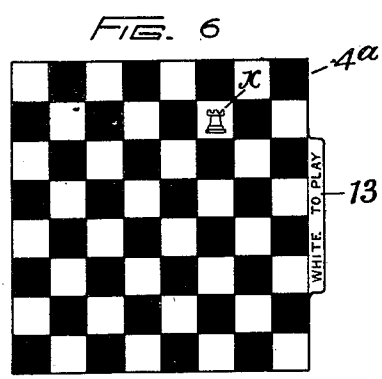
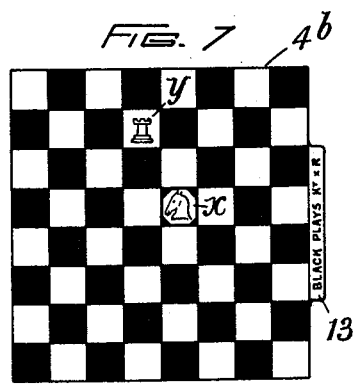
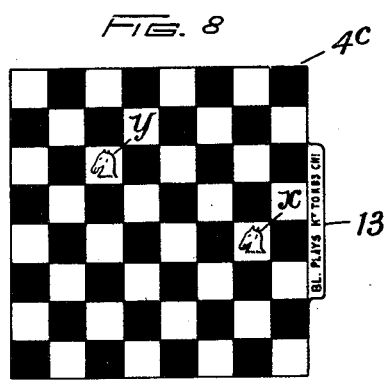
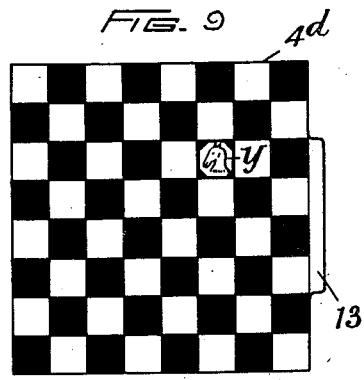
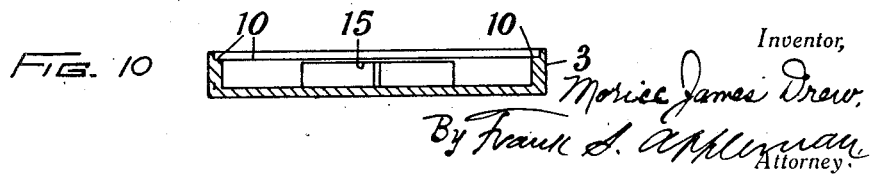
Inventor,
Morris James Drew,
By Frank S. Appleman
Attorney Patented May 1, 1951

2,551,318

UNITED STATES PATENT OFFICE 2,551,318

CHESS INSTRUCTION APPARATUS

Morice James Drew, Pinner, England

Application June 1, 1945, Serial No. 597,002
In Great Britain April 5, 1945

7 Claims. (Cl. 35—8)

This invention has reference to improvements in and relating to apparatus for use by persons learning how to play, and persons wishing to practise, games, problems and the like where pieces are moved over a chequer board, such as the games of chess and draughts.

The primary object of the present invention is to provide apparatus whereby a person wishing to learn or to practise the moves in an accepted or exemplary gambit, sequence of moves, model game or problem may do so by a process of trial and error without disclosing to himself (a) what is the correct playing piece to move in the accepted or exemplary gambit or the like until such time as he moves the said piece and (b) to what position the said playing piece should be moved in accordance with the said gambit or the like until such time as he takes deliberate action to ascertain the answer from the apparatus.

The apparatus according to the invention comprises a chequer board which is characterised in that viewing openings are provided in the squares thereof. The said apparatus also comprises a set of superposed cards adapted to be arranged beneath the board, the cards being provided with symbols indicating playing pieces and the symbols being so positioned on the cards that when the superposed cards are arranged beneath the board they, the symbols, lie beneath those openings in the squares corresponding to the positions which the pieces they indicate occupy on the board in their respective stages of an exemplary game or the like. When the exemplary game or the like is to be played successive cards of the set are arranged in the order in which the symbols they bear correspond to the order in which the playing pieces indicated by the symbols are to be moved in the said game or the like.

In order that the invention may be further understood reference will now be made to the accompanying drawings wherein:

Fig. 4 is a plan view of the apparatus shown in Fig. 1 but without the lid and chequer board;

Fig. 5 shows the chequer board in plan view.

Figs. 6, 7, 8 and 9 are plan views of reference cards and

Fig. 10 is a section of the apparatus on the line X—X, Fig. 4.

Figure 1:
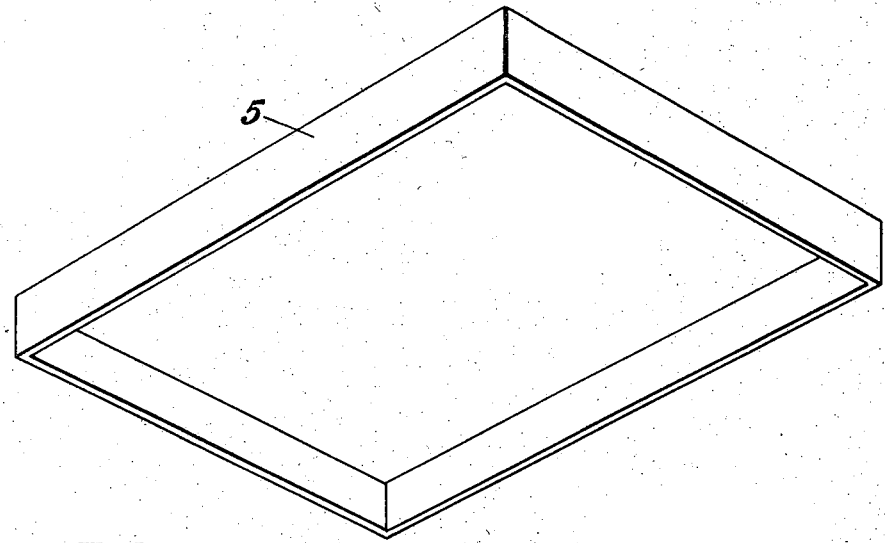
Fig. 1 is a perspective view of apparatus with the lid removed.
Figure 2:
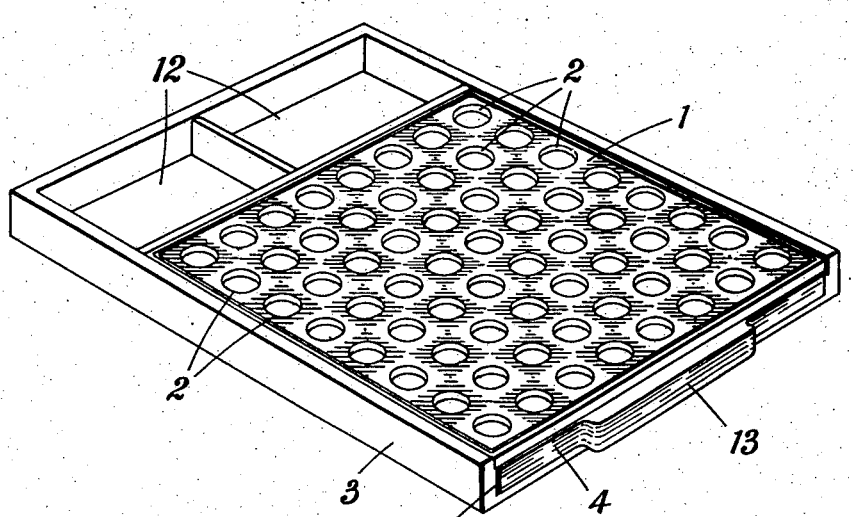
Fig. 2 is an underneath view of a playing piece to a larger scale than Fig. 1.

The apparatus shown on the drawing comprises principally a chequer board 1, the squares of which are provided with openings 2. A rectangular tray is provided below the board 1 to accommodate a set of key cards 4, parts of which are visible through the apertures 2. The tray is provided with a lid 5 which is shown in the lifted position in Fig. 1. Playing pieces 6 (Figs. 2 and 3) are adapted to fit into the apertures 2.

Three sides of the tray 3 are stepped at 10 and the chequer board 1 rests on the steps. The board is thus held in spaced relation to the bottom of the tray; it is a loose fit in the tray mouth so that it can easily be removed and replaced. The right hand end of the tray is open at 11 so that the cards can be inserted into and removed from the tray without removing the chequer board. Receptacles 12 for playing pieces are provided at the left hand side of the tray.

The cards shown have tabs 13 on their right hand sides which tabs facilitate manipulation of the cards and may bear instructions, instruction symbols, hints on play, or the like, said tabs being visible outside the area of the board 1. When the cards are in the positions shown in Figs. 1 and 4 their left hand ends butt against the corresponding wall of the tray and the tabs project from the open side 11. When the apparatus is not required for use the cards are turned round so that the tabs extend into a slot 15 in the left hand wall of the tray whilst their ends opposite to the tabs lie flush with or just within the open side 11. The lid can then be positioned on the tray.

The cards $4^a$—$4^d$ are chequered and bear symbols $x$ and $y$ as shown. It will be seen that the cards are about equal in size to the chequered area of the board 1 so that the squares on the cards lie beneath and match the squares on the board when the cards, stacked, are arranged beneath the board. Those portions of the squares on the cards visible through the openings 2 provide backgrounds which make the said openings less conspicuous. The cards are stacked $4^a$ on $4^b$ and so on so that successive symbols $x$ correspond to the order in which the playing pieces indicated by them are to be moved in an exemplary game or the like and successive symbols $y$ indicate the position to which the piece indicated by the symbol $x$ of the immediately preceding card is to be placed in accordance with the said game or the like. Moreover, the symbols are so located that they lie beneath those openings 2 corresponding to the positions which the pieces they indicate occupy on the board in their respective stages of the said game or the like. The tab 13 of the card 4ᵃ bears an instruction; tabs 13 of the cards 4ᵇ and 4ᶜ bear symbols indicating "Black's" move; the tab 13 of the card 4ᵈ, being on the last card of the set, is blank. It is not necessary that the said tab be blank—it may bear information.

Figure 3:
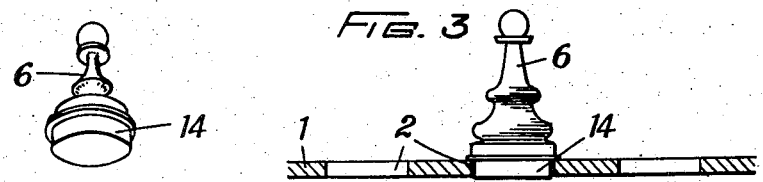
Fig. 3 is a side elevation of the said piece, part of the board being shown.

The bases of the pieces are of larger size than the openings 2, as will be seen by reference to the example piece shown in Fig. 3, and are provided at their bottoms with projecting portions as 14 (Figs. 2 and 3) adapted freely to enter the openings 2 but to prevent such side movement of the pieces as would expose the symbols beneath the occupied openings.

When the apparatus is to be used the requisite pieces are set up on the board as indicated by the illustration on card 7. Card 7 is slidden out of the tray through the open side 11. The player lifts a piece from the board. If it is the correct piece the symbol x, card 4ᵃ will be exposed; if it is the wrong piece only the blank square beneath the uncovered opening 2 will be exposed and the player will know he is wrong and must make a further essay. The player, having selected the right piece, proved by the appearance of the appropriate symbol on the card under the said piece, must then decide where to place it. He, having placed it, removes card 4ᵃ from the tray. If the said piece is correctly placed only blank squares will be visible through all openings 2 not covered by the pieces and the player will know that his move is correct. This may also be confirmed by lifting the piece, thereby exposing the symbol underneath. If the placing of the piece is incorrect the symbol y, card 4ᵇ will be visible and, therefore, the player will know that his placing was wrong. The player, having placed the piece on the square indicated by the symbol on the card, then moves as instructed on the tab 13 of card 4ᵇ ("Black plays knight takes rook") and then resumes his play and so on until he finally exposes symbol y, card 4ᵈ. It is to be observed that symbols x are covered by playing pieces until such time as the player removes them, for example, symbol x, card 4ᵇ is hidden by the knight on square "K5" until the player (and correctly so) removes this piece. He then selects the square to which he thinks this piece should be moved. Card 4ᵇ is then withdrawn and the non-appearance of the symbol y on card 4ᶜ will prove that he has moved the piece to the correct square.

A chequered card with no symbols on it may be included in the apparatus for use when the player desires to use the board without his having reference to the symbol-bearing cards.

The expression cards is used herein and in the accompanying claims for the elements on which the symbols are provided because the said elements are preferably of semi-stiff material such as paperboard but it is to be understood that the said expression covers elements of any suitable material such as paper.

The cards may be printed on both sides.

The notation of the game or the like up to any specific stage may be shown on the appropriate card and the complete game or the like may be printed in notation or book form and/or illustrated on one or all of the cards.

The cards are preferably numbered so that if they get out of order they may be readily arranged in correct sequence.

What I claim is:

1. Apparatus for playing or practising chess games and the like comprising a rigid unitary chequer board having through-reading apertures therein at the playing positions and further adapted to provide seating positions for the playing pieces, and means to support closely beneath the chequer board a plurality of instruction cards bearing symbols which register with and are readable through the apertures in the board, successive cards being so arranged that the symbols on them correspond to the order in which the playing pieces are to be moved in an exemplary sequence of moves and that the symbols are concealed at each stage solely by the playing pieces and are only disclosed by the removal of the pieces from their seating positions in said apertures.

2. Apparatus for playing or practising chess games and the like comprising a rigid unitary chequer board having through-reading apertures therein at the playing positions and further adapted to provide seating positions for the playing pieces, and means to support closely beneath the chequer board a plurality of instruction cards bearing symbols which register with and are readable through the apertures in the board, successive cards being so arranged that the symbols on them correspond to the order in which the playing pieces are to be moved, the cards having projecting tabs bearing additional instructions to indicate the point to which an assumed opponent's piece is to be moved on completion of the move, the first aforesaid symbols being concealed by the pieces to be played and only disclosed by the removal of the pieces from their seating positions in said apertures.

3. Apparatus for playing or practising chess games and the like comprising a rigid unitary chequer board having through-reading apertures therein at the playing positions and further adapted to provide seating positions for the playing pieces, means to support closely beneath the chequer board a plurality of instruction cards bearing symbols which register with and are readable through the apertures in the board, and lateral projections on said cards bearing additional information, the symbols on the instruction cards being displayed through the apertures in the board only by the removal of the pieces from their seating positions in said apertures while the additional information is visible externally of the board.

4. Apparatus for playing or practising chess games and the like comprising a rigid unitary chequer board having through-reading apertures therein at the playing positions and further adapted to provide seating positions for the playing pieces and means to support beneath the chequer board a plurality of stacked instruction cards, the uppermost card being disposed closely beneath the board, said cards being chequered to match the chequer board and said cards further bearing symbols which register with and are readable through the apertures in the board and are concealed by the playing pieces in position on the board and displayed only by the removal of the pieces from their seating positions in said apertures.

5. Apparatus for playing or practising chess games and the like comprising a rigid unitary chequer board having through-reading apertures therein at the playing positions, playing pieces, projecting portions on the bases of said pieces to fit within the apertures in the board, and means to support beneath the chequer board a plurality of stacked instruction cards, the uppermost card being disposed closely beneath the board and said cards bearing instructional data in some of the spaces registering with the apertures carrying the playing pieces, which data is revealed only by the removal of the pieces from their seating positions in said apertures.

6. Apparatus for playing or practising chess games and the like comprising a tray having a bottom therein and an open side, a rigid unitary chequer board in said tray spaced from the bottom thereof, said chequer board having through-reading apertures therein at the playing positions, playing pieces accommodated in some of said apertures and a plurality of stacked instruction cards in the tray beneath the chequer board, the uppermost card being disposed closely beneath the board and said cards bearing instructional data on the spaces registering with the apertures carrying the playing pieces, which data is only revealed by the removal of the pieces from their seating positions in said apertures, the series of cards being designed to indicate a correct sequence of moves in an exemplary move or game.

7. Apparatus for playing or practising chess games and the like comprising a tray having a bottom therein and an open side, a rigid unitary chequer board in said tray spaced from the bottom thereof, said chequer board having through-reading apertures therein at the playing positions, playing pieces accommodated in some of said apertures, a plurality of stacked instruction cards in the tray beneath the chequer board, the uppermost card coming closely beneath the board, and tabs on said instruction cards to permit the cards to be changed after each move of the playing pieces, said cards bearing instructional data on the spaces registering with the apertures carrying the playing pieces, which data is only revealed by the removal of the pieces from their seating positions in said apertures, the series of cards being designed to indicate a correct sequence of moves in an exemplary move or game.

MORICE JAMES DREW.

REFERENCES CITED

The following references are of record in the file of this patent:

UNITED STATES PATENTS

| Number | Name | Date |
|---|---|---|
| 250,458 | Shay | Dec. 6, 1881 |
| 529,913 | Howell | Nov. 27, 1894 |
| 1,221,493 | Whittaker | Apr. 3, 1917 |
| 1,532,069 | Ortiz | Mar. 31, 1925 |
| 1,730,640 | Brownell | Oct. 8, 1929 |
| 2,084,912 | Klep | June 22, 1936 |
| 2,096,672 | Goodson | Oct. 19, 1937 |
| 2,191,991 | Lloyd | Feb. 27, 1940 |
| 2,298,456 | Benko | Oct. 13, 1942 |

FOREIGN PATENTS

| Number | Country | Date |
|---|---|---|
| 198,531 | Great Britain | 1923 |